United States Patent Office 3,681,069
Patented Aug. 1, 1972

3,681,069
BINDER PLATE FOR USE IN XEROGRAPHY AND PROCESS THEREFOR
Raymond W. McNamee, Jr., Horsham, Frank J. Glavis, Rydal, and Anthony E. Schiavone, Hatboro, Pa., assignors to Rohm & Haas Company, Philadelphia, Pa.
No Drawing. Filed Oct. 28, 1966, Ser. No. 590,209
Int. Cl. C08d 13/16; C09d 5/02; G03g 5/00
U.S. Cl. 96—1.5                                   6 Claims

ABSTRACT OF THE DISCLOSURE

An electrophotographic plate and method of imaging the same. The binder used for the inorganic photoconductor consists essentially of a water-insoluble and electrically insulating evaporation residue of an aqueous solution of a water-soluble salt of a volatile base of either ammonia or a volatile amine and a resinous copolymer of
(1) at least 10% by weight of one or more alkyl acrylates in which the alkyl group has from 1–16 carbon atoms;
(2) from 10–25% by weight of either acrylic or methacrylic acid or a mixture thereof; and
(3) at least 10% by weight of at least one hardening comonomer; said copolymer being free of permanent ionic residues and having a $T_i$ value of $-10°$ C. to $20°$ C.

---

This invention relates to electrophotographic compositions, to a process of producing such compositions and to an electrophotographic process utilizing such compositions. More particularly, the invention relates to a novel organic resin binder for photoconductive zinc oxide pigments which combination is eminently suited for paper coating to produce an electrophotographic binder plate having unusual and unobvious properties.

A "binder plate," as the term is generally used in the art, refers to discreet particles of a photoconductive insulating material, generally inorganic, dispersed in a binder which itself is not photoconducting. The binder serves to bind the particles together in the form of a coating on a suitable substrate, generally paper. A wide variety of organic resins have been disclosed by the art as useful binders in this system. At present a large number of commercial electrophotographic copying machines are offered utilizing binder plates in the copying process. With the intense competition prevailing in this field there has long been great interest in developing a water-base coating system for producing electrophotographic coatings on paper substrates. Despite the obvious advantages of an aqueous system in terms of elimination of solvent costs, the fume and fire hazards associated with organic solvents, etc., the bulk of commercially used electrophotographic paper is understood to be produced by a solvent coating process.

Two coating systems utilizing an aqueous system have found limited acceptability. The one utilizes an aqueous dispersion of a thermosetting resin, and is believed to be no longer in commercial use. Attempts have been made to commercialize the use of a series of copolymers of vinyl acetate and crotonic acid. While the literature describes the use of significant amounts of crotonic acid in such copolymers, generally no more than 5% crotonic acid is utilized. Electrophotographically the binder plates produced with this material have generally good properties. However, the use of this resin in an aqueous system results in a combination which is difficult to dye sensitize properly. That is, either the dyes are relatively ineffective to enhance the light sensitivity of the zinc oxide or the dye produces a relatively strong color in the coating giving an objectionable hue to the final product. A major difficulty of the vinyl acetate-crotonic acid system is its relatively poor coating characteristics. This copolymer forms extremely viscous solutions thereby preventing the use of high solids coating colors which are essential for economic operation. Moreover, the copolymer has poor dispersing properties so that if used without a separate dispersing agent, the resulting coatings are grainy, cannot be gravity screened, do not flow smoothly and have a poor physical appearance. The use of a separate dispersing agent overcomes the graininess but at the cost of the electrophotographic properties.

Now, in accordance with the instant invention, a novel copolymer has been found which is useful in producing binder plates in an aqueous system without any separate dispersing agent. The coating colors produced with the resins of the invention have very high solids, low viscosity, are easily screened with gravity feed, flow smoothly and produce coatings of excellent appearance. The coatings are easily sensitized by readily available sensitizing dyestuffs producing coatings with only a slight off-white appearance and completely panchromatic response in the visible spectrum. Copies produced using the coatings of the invention have greater sharpness, are more panchromatic and are produced at lower light levels than similar coatings utilizing the vinyl acetate-crotonic acid copolymers of the prior art. These and other advantages of the invention will become apparent from the following description of the invention.

The copolymers used in the instant invention must contain from about 10 to about 25% acrylic or methacrylic acid, must have a $T_i$ value of from $-10°$ C. to $20°$ C. and must be prepared by the use of a catalyst system which does not produce permanent ionic residues. Copolymers in accordance with the present invention are those obtained by copolymerization of
(a) One or more of the lower acrylates in which the alkyl groups may have from 1–16 carbon atoms with
(b) A hardening comonomer and
(c) Either acrylic or methacrylic acid.

Examples of hardening comonomers (i.e., those effective to raise the $T_i$ of the copolymer) include the lower alkyl methacrylates in which the alkyl group may have 1–4 carbons, styrene, acrylonitrile, methacrylonitrile, acrylamide, hydroxyethyl methacrylate and the like. The ratio of lower alkyl acrylate and hardening comonomer is selected to give a $T_i$ for the copolymer in the range as indicated. Simple copolymers of only two monomers (as of a and c, supra) are definitely inferior to the polymers of the invention. The reason for this is not understood, but it is believed that using the mixture of monomers as in the invention results in a better distribution of functionality along the polymer chain.

The copolymer dispersions may be made by any of the known emulsion copolymerization procedures, e.g. by first mixing the several monomers in the desired proportions into an aqueous solution of an anionic or preferably nonionic dispersing or emulsifying agent. Examples of suitable emulsifiers are set forth in U.S. 2,790,735.

For the copolymerization, free radical catalysts, particularly catalytic systems of the redox type which break up into free radicals which do not form salt residues must be used. Such systems, as is well known, are combinations of oxidizing agents and reducing agent, such as a combination of tertiary butyl hydroperoxide and hydrazine or of hydrogen peroxide and hydroxylamine. Activators or promoters in the form of the salts (such as the sulfates or chlorides) of metals which are capable of existing in more than one valence state such as cobalt, iron, nickel and copper may be used in small amounts. The amount of such activators is so small that their presence does not affect the electrophotographic performance of the resulting resins. The amount of catalyst can vary but for purposes of efficiency from 0.1% to 5.0% based on the weight of the monomers of the peroxidic agent and the same or lower proportions of the reducing agent are recommended.

The most convenient method of preparing the copolymer dispersions comprises agitating an aqueous suspension of a mixture of the copolymerizable monomers and the redox catalytic combination at room temperature without the application of external heat. While the solids content of the dispersion can be varied over wide limits, it is preferred to produce dispersions which contain about 30–50% resin solids by weight. Because of the necessity of avoiding catalysts which form salt fragments on the polymer chain, per-salts such as persulfates, perborates, etc. should not be used as catalysts. Organic peroxides and hydroperoxides and hydrogen peroxide may be used as described.

It has been found that the use of the latex per se as the binder results in coatings having inferior properties. Accordingly, when use in forming electrophotographic coatings, the polymer latexes must first be dissolved. Solubilization of these acid copolymers is achieved by forming a soluble salt using a volatile alkali. By reason of cost and ease of handling, ammonia is preferred. However, volatile amines, such as ethylamine, can also be used. Solubilization is achieved by adding sufficient of the alkali to the latex. Generally the resulting solution will have a pH value of from about 8 to about 9.5.

The ratio of pigment to binder is not critical and the customary ratio as used in the art may be followed. Generally such ratios are from about 1 to 10 parts of pigment to one part of binder. By reasons of cost and performance, it is preferred to use from 5 to 8 parts of pigment to one of binder. A number of brands of photoconductive zinc oxide are available and all of them may be used with the binder of the invention. If desired, a base coating may be applied to the paper base. Similarly, a conductivity aid may be incorporated in the paper-making furnish.

Despite the importance of excluding catalysts which decompose into salts when the copolymer is prepared using the fugitive catalyst systems as described, it has been found that the binder is relatively insensitive to the presence of even significant amounts of ionic impurities. Thus deionized water need not be used. Water having a hardness of 1500 p.p.m. (as $CaCO_3$) or more may be used without loss in electrophotographic properties.

In the following examples which are illustrative of the invention, the parts and percentages are by weight unless otherwise noted. In each of the examples the dye sensitizer used was a mixture of 3 parts bromophenol blue and one part uranine (Color Index No. 45350). In most of the examples where voltage measurements were taken, an aluminum substrate was used to obtain greater reproducibility of the measurements.

EXAMPLE 1

A copolymer was prepared by the emulsion polymerization of a mixture of 50 parts butyl acrylate, 25 parts methyl methacrylate, 10 parts styrene and 15 parts methacrylic acid. The initiator system was 1.5% hydrogen peroxide, 0.75% hydroxylamine and 5 p.p.m. ferrous ion. The emulsifying agent was 0.5% sodium lauryl sulfate. The solids content of the latex was 35.0%, the emulsion had a pH of 7.2 and a viscosity of 120 cps. The copolymer had an intrinsic viscosity of 0.14 (in acetone at 30° C.).

A coating color was prepared by mixing in a high speed blender 25.5 parts of water, 0.5 part of a 40% aqueous solution of a commercial thickener, 0.2 part of a commercial defoamer, 0.0105 part dye sensitizer mixture, 21.4 parts of the resin binder prepared as above, 0.3 part 28% aqueous ammonium hydroxide and 52.3 parts of photoconductive zinc oxide. The ingredients were added in the order given with mixing after each addition. The resulting formulation had a pigment-to-binder ratio of 7:1, a dye sensitizer level of 0.02% based on the zinc oxide, a thickener content of 2.66% based on the polymer solids, a total solids content of 60%, a viscosity of about 90 cps. Brookfield and a pH of 8.5. The mixture was passed through a 100 mesh screen with gravity feed and was then coated on aluminum foil based with a No. 16 wire rod to give a coating weight of about 20 pounds per 3,000 square feet. The resulting binder plate had a smooth surface with only a slight off-white hue. The plate is useful in commercial electrophotographic copying machines giving sharp images at relatively low light levels.

EXAMPLES 2 THROUGH 6

A series of four copolymer latexes were prepared as in Example 1 but having different monomer compositions. These copolymers had the following compositions:

TABLE I

| Example No.— | Composition [1] |
|---|---|
| 2 | BA:MMA:S:MAA 50:16.5:10:22.5 |
| 3 | BA:MMA:AM:MAA 50:25:10:15 |
| 4 | BA:MMA:VAc:MAA 50:25:10:15 |
| 5 | BA:MMA:S:AA 50:25:10:15 |
| 6 | BA:MMA:AN:MAA 50:25:10:15 |

[1] BA=butyl acrylate; MMA=methyl methacrylate; S=styrene; MAA=methacrylic acid; AM=acrylamide; VAc=vinyl acetate; AA=acrylic acid; and AN=acrylonitrile.

The resulting latexes were then used to formulate zinc oxide electrophotographic coatings and coated on an aluminum base as in Example 1 excepting that the coating weight was approximately 16 lbs. per 3300 sq. ft. The binder plates so produced were then conditioned at 65% relative humidity and the charge acceptance and residual charge (i.e., charge remaining after standing 7 seconds in the dark) determined. The binder plate produced in Example 1 was used as a control. The results are set forth in the following table:

TABLE II

| | Volts | |
|---|---|---|
| Example number | Charge acceptance | Residual charge |
| Control | 360 | 300 |
| 2 | 293 | 178 |
| 3 | 360 | 188 |
| 4 | 358 | 309 |
| 5 | 322 | 193 |
| 6 | 306 | 194 |

EXAMPLE 7

Example 1 was repeated and two electrophotographic compositions with zinc oxide were prepared as set forth in Example 1 except that the one coating contained 2.7% of ammonium sulfate and a paper base was used instead of aluminum. The charge acceptance and residual charge were then measured as in Examples 2 through 6. The results are set forth in the following table:

TABLE III

| | Charge acceptance | Residual charge |
|---|---|---|
| Control | 428 | 264 |
| Control plus 2.7% ammonium sulfate | 416 | 228 |

EXAMPLES 8 TO 10

A copolymer latex was prepared as in Example 1. The latex was then used to prepare two electrophotographic coating compositions as in Example 1 but differing therefrom in that Example 8 contained 65% solids, Example 9 contained 70% solids, the thickener was omitted from both and a paper base was used instead of aluminum. For Example 10, a commercial vinyl acetate:crotonic acid copolymer containing 5% crotonic acid was also used to prepare a coating color precisely as described in Example 1 (i.e., at 60% solids) excepting that the thickener was omitted and the coating could not pass through a 100 mesh screen with gravity feed. (Attempts to prepare a color at a 64% solids with the commercial copolymer were unsuccessful as the coating became dilatant and unmanageable.) The coating weight for all three examples was 24 pounds for 3300 sq. ft. The coating colors for Examples 8 and 9 had viscosities of 30 cps. and 55 cps., respectively, flowed smoothly and could be easily screened through the 100-mesh screen with gravity feed. The coating color of Example 10 was coarse, was highly dilatant and could not be screened as indicated.

The binder plate of Example 10 had a grainy appearance and a definite blue hue whereas the papers of Examples 8 and 9 had a smooth, even appearance and were slightly off-white without any distinct blue color. When used in a commercial electrophotocopying machine (the binder plates were first conditioned at 65% relative humidity), the binder plates of Examples 8 and 9 gave copies which were noticably sharper at lower light settings than the binder plate of Example 10. The binder plate of Example 10, despite its stronger bluish color, had a slight red-green color-blindness (although showing excellent speed when tested under steady state conditions), whereas the plates of Examples 8 and 9 were completely panchromatic in the visible spectrum.

What is claimed is:

1. An electrophotographic binder plate comprising a base and a coating on said base comprising a major proportion of finely-divided photoconductive zinc oxide pigment and a minor proportion compared to said pigment of a binder for said pigment consisting essentially of a water-insoluble and electrically insulating evaporation residue of an aqueous solution of a water-soluble salt of a volatile base of either ammonia or a volatile amine and a resinous copolymer of
    (1) at least 10% by weight of one more alkyl acrylates in which the alkyl group has from 1–16 carbon atoms;
    (2) from 10–25% by weight of either acrylic or methacrylic acid or a mixture thereof; and
    (3) at least 10% by weight of at least one hardening comonomer; said copolymer being free of permanent ionic residues and having a $T_i$ value of $-10°$ C. to $20°$ C.

2. A binder plate according to claim 1 wherein the volatile base is ammonia.

3. A binder plate according to claim 1 wherein the hardening comonomer is selected from the group consisting of styrene, acrylonitrile, methacrylonitrile, acrylamide, vinyl acetate, hydroxyethyl methacrylate and alkyl methacrylates in which the alkyl group has from 1–4 carbon atoms.

4. A binder plate according to claim 3 wherein the alkyl acrylate is methyl acrylate, ethyl acrylate, n-butyl acrylate, isobutyl acrylate, or a mixture thereof.

5. A binder plate according to claim 1 wherein the volatile base is ammonia; the alkyl acrylate is ethyl acrylate, n-butyl acrylate, isobutyl acrylate or a mixture thereof; and the hardening comonomer is a mixture of at least two monomers selected from the group consisting of methyl methacrylate, styrene and vinyl acetate.

6. A process for producing an electrostatic image corresponding to a pattern of light and shadow, said process comprising:
    (a) in the absence of active radiation placing sensitizing electrostatic charges of one polarity on the photoconductive insulating surface of a xerographic member comprising a conductive backing and a thin photoconductive insulating layer thereon of finely-divided photoconductive zinc oxide particles dispersed in an insulating resin binder, the ratio by weight of particles-to-binder being from 1–10 parts of zinc oxide to one part of binder, said binder consisting essentially of the evaporation residue of an aqueous solution of the water-soluble salt of either ammonia or a volatile amine with a copolymer of
        (1) at least 10% by weight of one or more alkyl acrylates in which the alkyl group has from 1–16 carbon atoms;
        (2) from 10–25% by weight of either acrylic or methacrylic acid; and
        (3) at least 10% by weight of at least one hardening comonomer, said copolymer being free of permanent ionic residues and having a $T_i$ value of $-10°$ C. to $20°$ C.; and
    (b) exposing the electrically charged surface to a pattern of light and shadow to be recorded whereby electrostatic charges migrate through said layer in the areas irradiated by light so that an electrostatic image is formed corresponding to said pattern.

References Cited
UNITED STATES PATENTS

| | | | |
|---|---|---|---|
| 3,048,501 | 8/1962 | Miller et al. | 117—155 |
| 3,245,783 | 4/1966 | Neugebauer et al. | 96—1 |
| 3,253,914 | 5/1966 | Schaum et al. | 96—1 |
| 3,121,006 | 2/1964 | Middleton et al. | 96—1.5 |
| 3,241,958 | 3/1966 | Bornarth et al. | 96—1.8 |
| 3,471,625 | 10/1969 | Adams et al. | 96—1.8 |

GEORGE F. LESMES, Primary Examiner

M. B. WITTENBERG, Assistant Examiner

U.S. Cl. X.R.

96—1 R; 117—155 U, 161 UIT, 161 UIC; 260—29.6 TA